United States Patent [19]
Pletcher et al.

[11] Patent Number: 5,727,178
[45] Date of Patent: Mar. 10, 1998

[54] SYSTEM AND METHOD FOR REDUCING STACK PHYSICAL MEMORY REQUIREMENTS IN A MULTITASKING OPERATING SYSTEM

[75] Inventors: Richard Allen Pletcher, Redmond; Ralph Allen Lipe, Woodinville, both of Wash.

[73] Assignee: Microsoft Corporation, Redmond, Wash.

[21] Appl. No.: 759,450

[22] Filed: Dec. 5, 1996

Related U.S. Application Data

[63] Continuation of Ser. No. 518,426, Aug. 23, 1995, abandoned.

[51] Int. Cl.$^6$ .............................. G06F 12/00; G06F 12/02; G06F 12/14
[52] U.S. Cl. .................... 395/412; 395/412; 395/497.01; 395/497.02; 395/497.04; 395/490
[58] Field of Search ............................ 395/412, 497.01, 395/497.02, 497.04, 479, 490, 474

[56] References Cited

U.S. PATENT DOCUMENTS 4,926,322   5/1990   Stimac et al. ............................. 364/200

OTHER PUBLICATIONS

"Encyclopedia for Windows™: The One Book That Belongs Beside Your Personal Computer" *Windows™ Magazine*, The Eddy Group 1993, p. 856.

King, Adrian, *Inside Windows™ 95*, Microsoft Press 1994, pp. 48–53, 112–121.

*Primary Examiner*—Robert W. Downs
*Assistant Examiner*—Than V. Nguyen
*Attorney, Agent, or Firm*—Jones & Askew, LLP

[57] ABSTRACT

An operating system component allocates locked stack memory pages to threads on an as needed basis. Each thread has a permanent locked stack. A second locked stack page is mapped to each thread. If a thread is using the assignable locked stack page when the system scheduler switches away from that thread, the assignable stack page becomes owned by that thread. When the system scheduler switches to a thread the assignable stack page mapped to that thread is checked to see if it is owned by another thread. If so, an unowned assignable stack page is mapped to the thread prior to switching to that thread. The size of the pool of locked assignable stack pages is adjusted dynamically. If the number of unowned assignable stack pages exceeds a threshold, locked stack pages are released. If the number of locked assignable stack pages falls below a predetermined number, additional assignable stack pages are allocated.

23 Claims, 8 Drawing Sheets

5,727,178

SYSTEM AND METHOD FOR REDUCING STACK PHYSICAL MEMORY REQUIREMENTS IN A MULTITASKING OPERATING SYSTEM

This is a continuation of application Ser. No. 08/518,426 filed Aug. 23, 1995, now abandoned.

TECHNICAL FIELD

The present invention relates to system and method for managing memory in a computer, and more particularly relates to a method for allocating stack memory to processes managed by an operating system.

BACKGROUND OF THE INVENTION

Modern microprocessors and the operating systems designed for them are capable of implementing paged virtual memory schemes. Virtual memory is a method for allowing several concurrently running program modules to share the physical memory of a computer. Virtual memory is managed by the operating system and provides each program module with a large, private, readily accessible address space.

A computer's virtual memory is made up of the computer's physical memory (i.e., the random access memory (RAM)) and a "swap file" on the computer's hard disk. The operating system manages this available memory by swapping program and data segments back and forth between the RAM and the swap file. Program and data segments are copied from the hard disk to RAM when they are needed by a program module. If the data is not needed, it can remain on the hard disk. If a program module attempts to access a program or data segment that is not in RAM, the microprocessor will generate an interrupt that causes the operating system to load the missing segment into available RAM.

Paging operations are more efficient if data is grouped together and copied in "pages" instead of one byte at a time. Intel Corporation's "PENTIUM" and 80X86 microprocessors implement memory pages that include 4K bytes. Each memory segment is made up of one or more 4K pages. In a paged virtual memory system the terms paging, page file, and page fault are synonymous with the terms swapping, swap file, and not present interrupt, respectively.

An operating system may permit memory pages to be "locked" into memory. This prevents the pages from being paged to the hard disk and ensures that the locked pages are always available to their program module. Locked memory is required for critical functions that will fail if they encounter a page fault when trying to access memory. This is the case with some elements of the operating system. Although locked memory is essential for some program modules, it is preferable to minimize the amount of locked memory in order to increase the size of the paged memory and the efficiency of the paging process.

In some multitasking operating systems, such as Microsoft Corporation's "WINDOWS 95" operating system, a "thread" is an execution path within a process and forms the basic unit of scheduling. A multitasking operating system manages many threads. The operating system's scheduler allows each thread to execute code in accordance with predetermined criteria and conditions.

Each thread is allocated its own stack memory, which is used to store status data such as procedure and function call return addresses, passed parameters, and local variables. The stack memory is organized as a LIFO (last in, first out) data structure so that the last item written to the stack is the first item read from the stack. A stack pointer is a register that contains the address of the top element of the stack.

Stack memory must be locked in order to ensure that the system operates properly and prevent fatal page faults. In paged systems of the type described briefly above, this requires that each thread be allocated at least one page (i.e., 4K) of locked stack memory. It is preferable to limit the amount of locked stack memory to one page in order to minimize the amount of locked memory.

Under some conditions, a thread may overflow a 4K stack, resulting in a fatal error. This problem can be solved by allocating more locked stack memory to each thread. However, this solution is undesirable because doubling or tripling the amount of locked memory allocated to every thread would greatly increase the amount of locked memory found in the system, and decrease the efficiency of the paging scheme.

Therefore, there is a need in the art for a process that provides additional locked stack memory for those threads that require it, without greatly increasing the total amount of locked memory used in the system.

SUMMARY OF THE INVENTION

The present invention satisfies the above described need by using a small pool of assignable locked stack pages to increase the size of a thread's locked stack memory on an as-needed basis.

Generally described, the present invention provides a method for allocating memory to a thread in a multitasking operating system managing a plurality of threads. The method maps an assignable memory page to one of the threads. When the scheduler indicates a switch to that thread, the method determines whether the mapped assignable memory page is owned by another thread. If not, the method switches to that thread.

In yet another aspect, the present invention provides a method for allocating memory to a thread. The method maps a first assignable memory page to a first one of the threads and determines whether the first thread is using the first assignable memory page. If so, the method prevents other threads from using the first assignable memory page. If not, the method allows a second one of said plurality of threads to use the first assignable memory page.

More particularly described, the present invention establishes first and second threads, which are associated with first and second stacks. A first permanent stack page is mapped to the first thread and a second permanent stack page is mapped to the second thread. A first assignable stack page is also mapped to the first and second threads. When the system indicates that it is switching from the first thread to the second thread, the method determines whether the first thread is using the first assignable stack page. If so, the method indicates that the first assignable stack page is owned by the first thread. The method also determines whether the first assignable stack page is available to the second thread. If not, the method maps a second assignable stack page to the second thread. The method switches to the second thread in the event that the first assignable stack is available or a second assignable stack page is mapped to the second thread.

In another aspect, the method of the present invention establishes first and second threads and maps first and second permanent stack pages to the first and second threads, respectively. A first assignable stack page is mapped to the first thread and a second assignable stack page is mapped to the first thread. When the system indicates that it is switching from the first thread to the second thread, the method determines whether the second assignable stack page is available to the second thread. If so, the method switches to the second thread.

In yet another aspect, the present invention provides a system for allocating memory among a plurality of threads run by an operating system. The CPU is operative to map an assignable memory page to a selected one of the threads and to receive an indication to switch to the selected thread. At that point, the CPU determines whether the mapped memory page is owned by another thread. If not, the CPU switches to the selected thread.

In yet another aspect, the present invention provides a computer-readable medium that stores a computer program for allocating locked stack memory to a selected one of threads running in a multitasking operating system. The computer program includes instructions, which when executed by a computer, map an assignable memory page to the selected thread. The program receives an indication to switch to the selected thread and determines whether the mapped assignable memory page is owned by another thread. If not, the program switches to the selected thread.

It is therefore an object of the present invention to provide increased stack size while minimizing the amount of locked stack memory.

It is a further object of the present invention to increase a thread's stack size on an as-needed basis.

It is further object of the present invention to dynamically adjust the number of assignable locked stack pages available to be mapped to threads.

These and other objects, features, and advantages of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
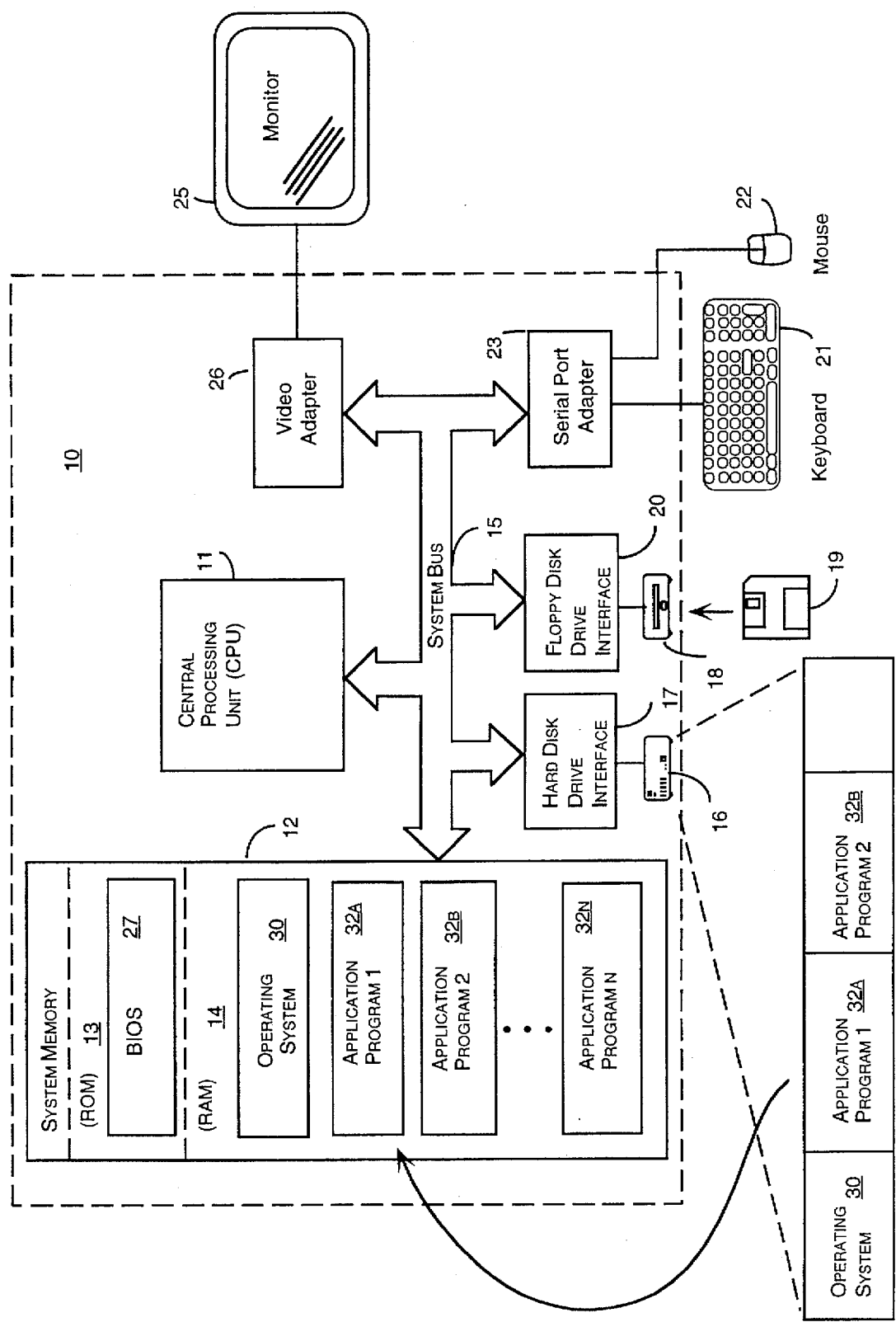
FIG. 1 is block diagram of a personal computer suitable for use in implementing the present invention.

The preferred embodiment of the present invention is directed to a system and method for allocating locked stack memory to threads on an as-needed basis and is implemented in an operating system that runs on an IBM-compatible personal computer. The present invention, which is referred to as the stack memory manager, allows an operating system to provide sufficient locked stack memory for each of the threads executed by the computer while minimizing the total amount of locked memory. The operation of the stack memory manager is transparent to the user and to the application programs running on the computer.

Although the preferred embodiment will be generally described in the context of an operating system running on a personal computer, those skilled in the art will recognize that the present invention also can be implemented in conjunction with other operating systems for other types of computers. Accordingly, it will be understood that the terms "operating system" and "computer" generally include all types of computers and the operating systems designed for them.

Turning first to the nomenclature of the specification, the detailed description which follows is represented largely in terms of processes and symbolic representations of operations by conventional computer components, including a central processing unit (CPU), memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. The operations described herein are machine operations performed in conjunction with a human operator or user that interacts with the computer. The machines used for performing the operation of the present invention include general purpose digital computers or other similar computing devices.

In addition, it should be understood that the programs, processes, method, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now the drawings, in which like numerals represent like elements throughout the several figures, the present invention and the preferred operating environment will be described.

The Operating Environment

Figure 2:
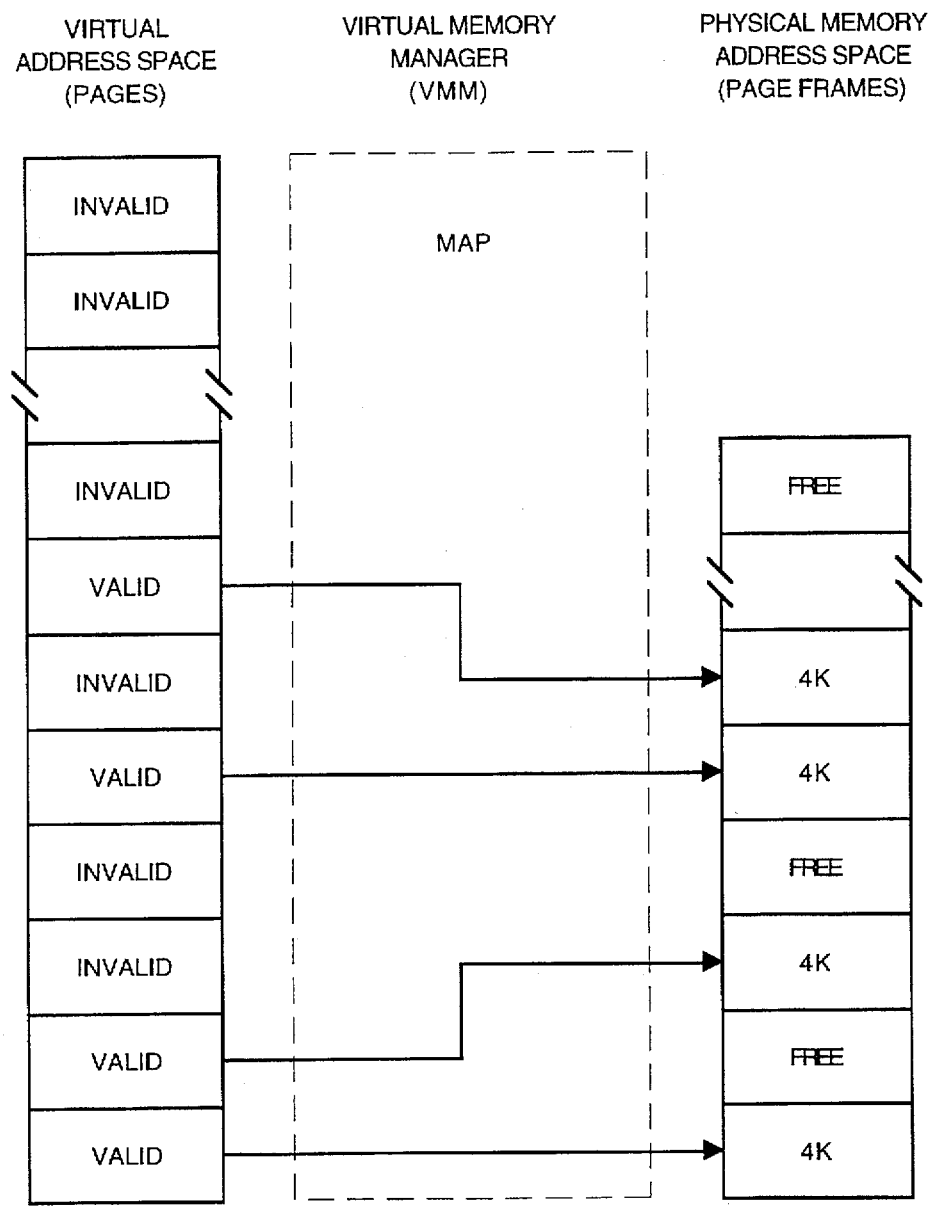
FIG. 2 is a diagram illustrating the virtual memory scheme employed in the personal computer of FIG. 1.

FIGS. 1 and 2 illustrate various aspects of the preferred computing environment in which the present invention is designed to operate. Those skilled in the art will immediately appreciate that FIGS. 1 and 2, and the associated discussion, are intended to provide a brief, general description of the preferred computer hardware and operating system, and that additional information is readily available in the appropriate programming manuals, user's guides, and similar publications.

FIG. 1 illustrates a conventional IBM-compatible personal computer 10 suitable for implementing the present invention. As shown in FIG. 1, the personal computer 10 includes a central processing unit (CPU) 11, such as the 80486 or "PENTIUM" microprocessors manufactured by Intel Corporation of Santa Clara, Calif. The personal computer also includes system memory 12 (including read only memory (ROM) 13 and random access memory (RAM) 14), which is connected to the CPU by the system bus 15. A hard disk drive 16 is connected to the system bus 15 via the hard disk drive interface 17. A floppy disk drive 18, which is used to read or write a floppy disk 19, is connected to the system bus 15 via a floppy disk drive interface 20. A keyboard 21 and a mouse 22 are connected to the system bus 15 via a serial port adapter 23. A monitor 25 is connected to the system bus 15 via a video adapter 26.

Although many other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as the operating system, application programs and data are provided to the personal computer 10 via one of its memory storage devices, which may include the hard disk drive 16, floppy disk 19, RAM 14, ROM 13 and a CD-ROM (not shown). In the preferred personal computer 10, the hard disk drive 16 is used to store data and programs, including the operating system and application programs.

When the personal computer 10 is turned on or reset, the Basic Input/Output System (BIOS) 27, which is stored in the ROM 13, instructs the CPU 11 to load the operating system 30 from the hard disk drive 16 into the RAM 14. Once the operating system 30 is loaded into RAM 14, the CPU 11 executes the operating system code and causes the visual elements associated with the user interface of the operating system 30 to be displayed on the monitor 25. When an application program 32a is opened by a user, the program code and relevant data are read from the hard drive 16 and stored in the RAM 14.

The preferred embodiment of the present invention is designed to operate in conjunction with Microsoft Corporation's "WINDOWS 95" operating system. However, it should be understood that the invention can readily be implemented in other operating systems, such as Microsoft Corporation's "WINDOWS 3.1" operating system, IBM Corporation's "OS/2" operating system, and the operating system used in "MACINTOSH" computers manufactured by Apple Computer, Inc.

Before turning to the details of the present invention, it is helpful to review related features of the preferred "WINDOWS 95" operating system.

Schedulers and Threads

The "WINDOWS 95" operating system includes a "virtual machine manager" that includes software to implement all the basic system primitives for task scheduling, virtual memory operations, program loading and termination, and intertask communication. In this and other multitasking operating systems, one or more schedulers determine the order in which the various tasks will be executed by the microprocessor.

In the "WINDOWS 95" operating system, the objects managed by the system scheduler are called "threads." A thread is defined as an execution path within a process. When the "WINDOWS 95" operating system loads an application and creates the associated process data structures, the system sets up the process as a single thread. Many application programs will use only a single thread throughout their execution lifetimes. However, an application program can create additional threads to carry out various functions.

Any process can create many concurrent threads. Each thread has its own private stack storage and execution context, but shares the physical memory allocated to the original process. Multiple threads allow a single application to easily manage its own background activities and to offer a highly responsive interface to the user.

The preferred operating system includes two schedulers within the virtual machine: the primary scheduler, which is responsible for calculating thread priorities, and the time slice scheduler, which is response for calculating the allocation of time slices. Ultimately, the time slice scheduler decides what percentage of the available processor time to allocate the different threads. The singular term "scheduler" is used to refer to the scheduling function in general as carried out by both the primary scheduler and the time slice scheduler.

Virtual Memory Management

As mentioned briefly above, the present invention operates in conjunction with a paged virtual memory scheme. The general operation of the virtual memory scheme implemented by the "WINDOWS 95" operating system will now be described in conjunction with FIG. 2.

Virtual memory is a method that allows several concurrently running programs to share the computer's physical memory, and to have access to as much memory as they need. The management of virtual memory takes place under the control of the operating system. The personal computer's virtual memory is made up of the computer's physical memory (i.e., RAM) and a "swap file" on the hard disk drive. The operating system manages this available memory by swapping program and data segments back and forth between the RAM and the swap file on the hard disk drive.

Those skilled in the art will understand the relationship between the physical structure and logical structure of memory, and the manner in which the operating system translates from one structure to the other. Physical memory refers to the RAM that is present in the computer. Logical memory (or virtual memory) refers to the way in which a program views memory, i.e., the address space that is available to each program or thread. Although the number of physical addresses on a computer is limited by how much RAM the computer has, the number of logical or virtual addresses is limited only by the number of bits in a virtual address. A microprocessor with a 32-bit address bus has a virtual address space of up to 4 gigabytes ($2^{32}$). Thus, the virtual address space is much larger than the physical address space.

Because of the discrepancy between the physical address space and the virtual address space, the virtual memory system must do two things. First, the virtual memory system must translate or map each thread's virtual addresses into physical memory locations. When a thread reads or writes to its virtual address space, the virtual memory system uses the virtual address to identify the correct address in the physical memory. Second, the virtual memory system must swap some of the contents of the physical memory to the hard disk drive when the physical memory becomes overcommitted. This is illustrated in FIG. 2.

For example, if the instructions found in a particular code segment are to be executed by the CPU, that segment must be loaded into RAM. Other code segments can stay on the hard disk drive until they are needed. When a program tries to read or execute a segment that is not currently in RAM, the CPU will inform the operating system of the problem by generating a page fault or "not present interrupt". The operating system then loads the missing segment into RAM and restarts the program that caused the interrupt.

In order to make the process of moving data back and forth between memory and the hard disk drive more efficient, virtual address space is divided into equal sized blocks called pages. Similarly, physical memory is divided into blocks called page frames, which are used to hold pages of memory. Each process has a set of pages from its virtual address space that are present in physical memory at any given time. Pages that are in physical memory and immediately available are called valid pages. Pages that are stored on the hard disk drive are called invalid pages. This is also illustrated in FIG. 2.

The performance of a virtual memory management system depends on determining how much of a program to keep in RAM at one time and which segments to move from RAM to the hard disk drive when the RAM is full and the operating system needs space for a new segment. The goal is to minimize the total number of swap operations because copying data to and from the hard disk drive are relatively slow operations.

The delay that results from a page fault may be relatively large. Large page sizes offset this cost because more data is loaded into memory for each page fault, thus causing fewer page faults to occur. Page sizes that are too large result in too much being copied. Therefore, a balance is needed between large and small page sizes. Microprocessors such as the 80486 facilitate virtual memory management by supporting a paged virtual memory scheme. For the 80486 and related microprocessors, a memory page is 4K bytes, and each segment includes one or more 4K pages.

In order to prevent critical pages in physical memory from being paged to the hard disk drive, the virtual memory manager supports "locked" pages. Locking a page ensures that the page will not be removed from physical memory while any thread in the process is running. Time critical programs and critical operating system elements require locked memory.

At this point, those skilled in the art will understand the relevant features of the operating system, namely the scheduling of multiple threads and the operation of paged virtual memory. It should be appreciated that operating systems such as the "WINDOWS 95" operating system are quite complex and provide a wide variety of features and services. For more comprehensive information regarding these and other features of the "WINDOWS 95" operating system, the reader may refer to any of a variety of publications, including *Inside Windows 95*, by A. King, published by Microsoft Press, 1994. For general information regarding virtual memory, the reader may refer to *Inside Windows NT*, by H. Custer, published by Microsoft Press, 1993.

The Preferred Method For Managing Locked Stack Memory

Figure 3B:
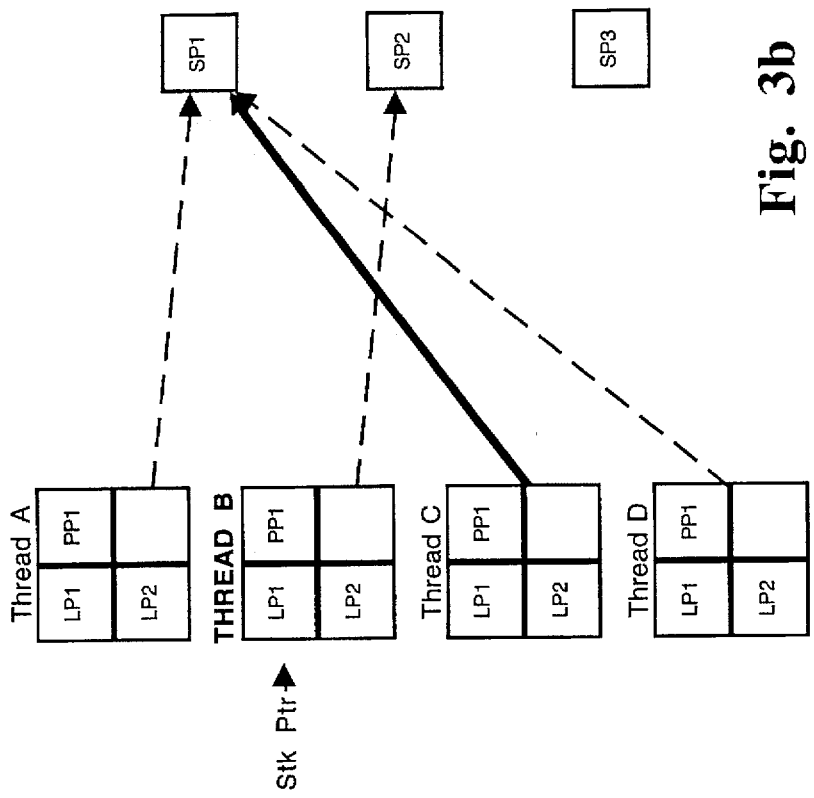
FIG. 3, consisting of FIGS. 3a–3f, includes diagrams illustrating the operation of the preferred method for allocating locked stack pages.
Figure 3A:
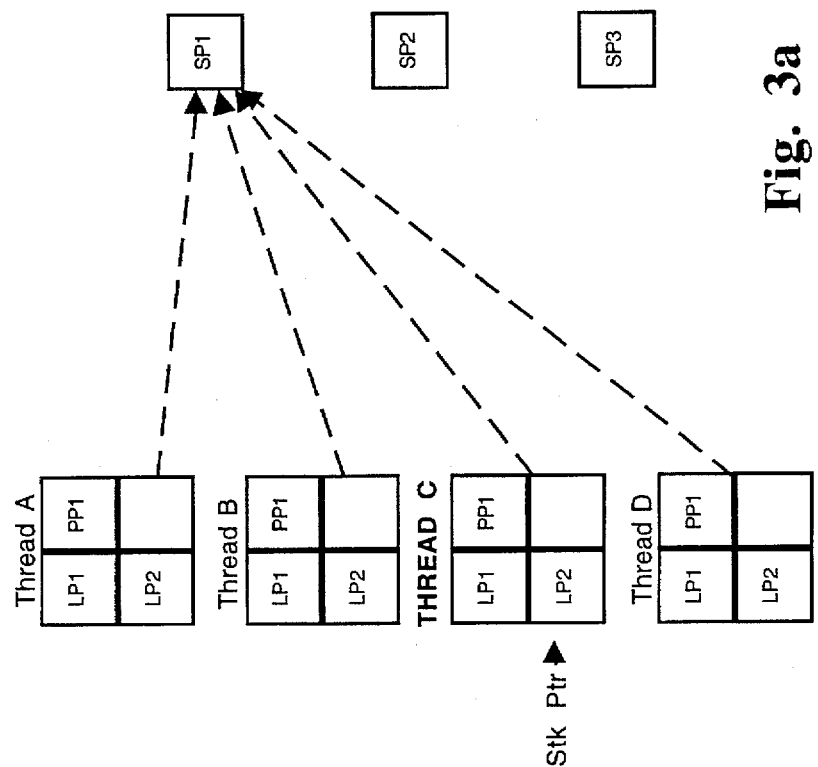
Figure 3D:
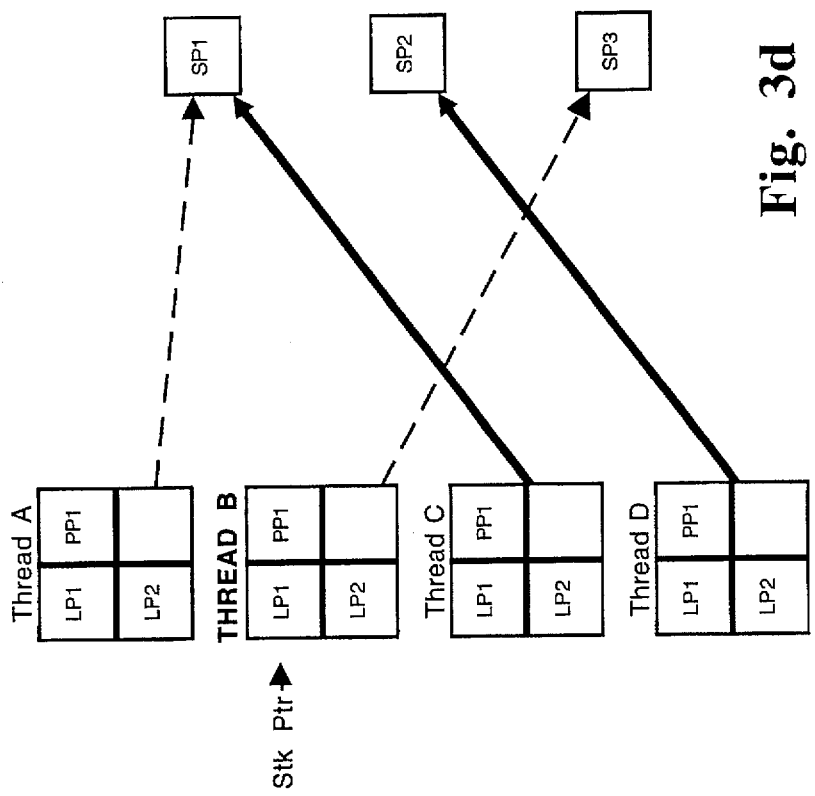
Figure 3C:
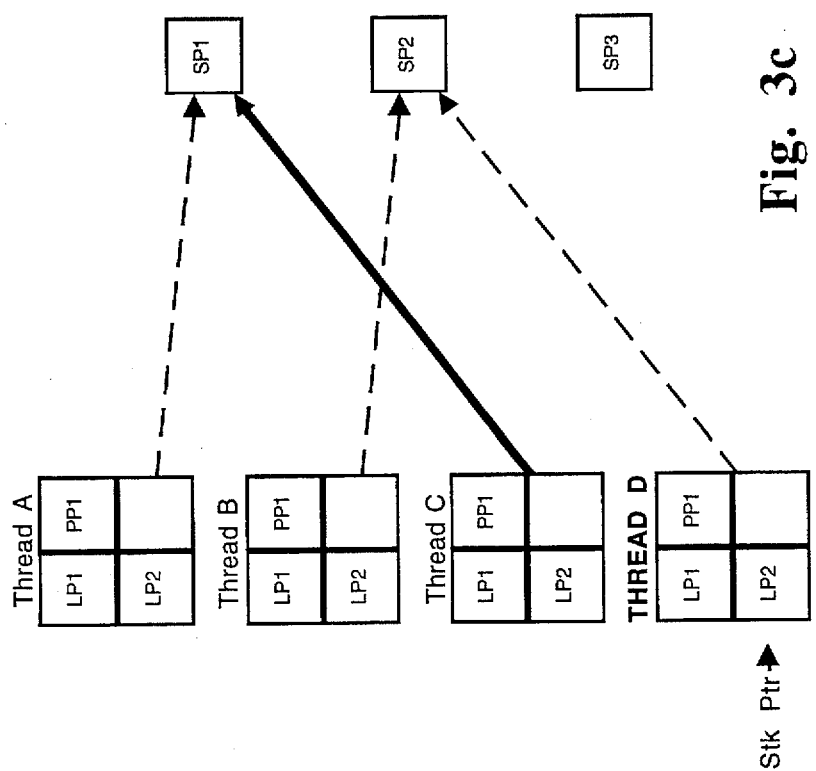
Figure 3F:
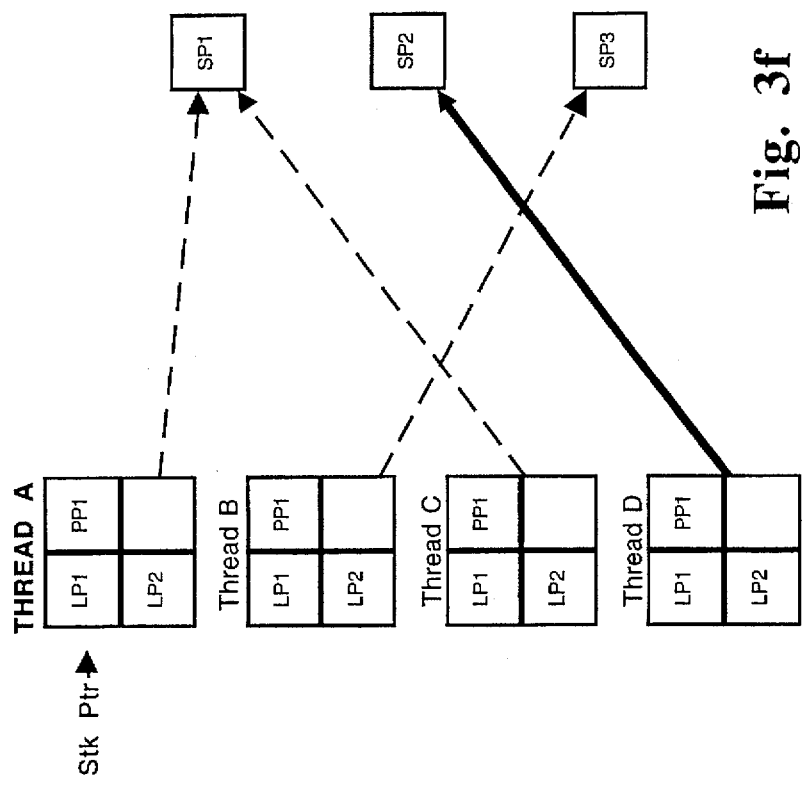
Figure 3E:
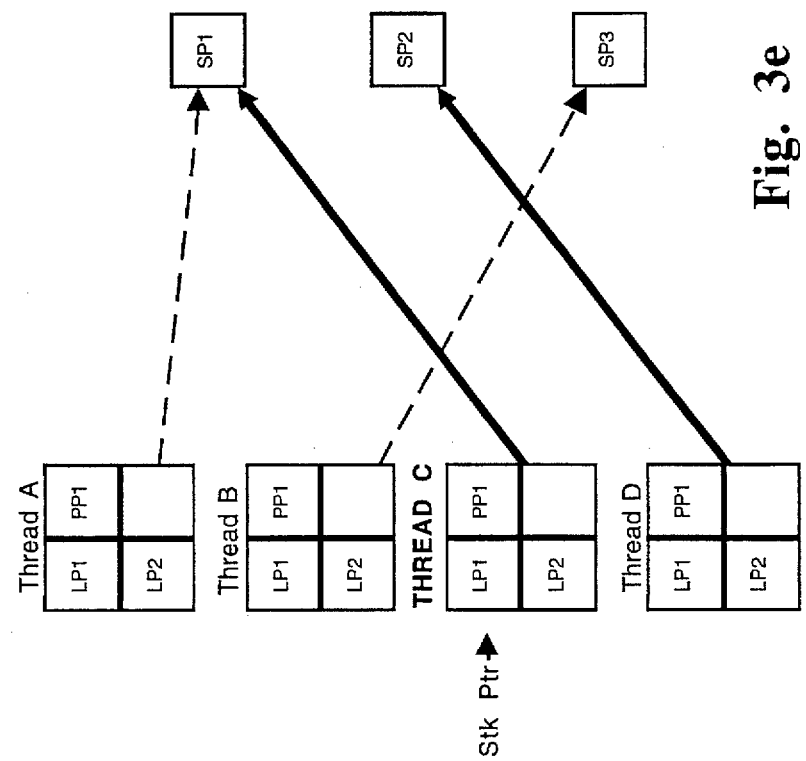
Figure 4:
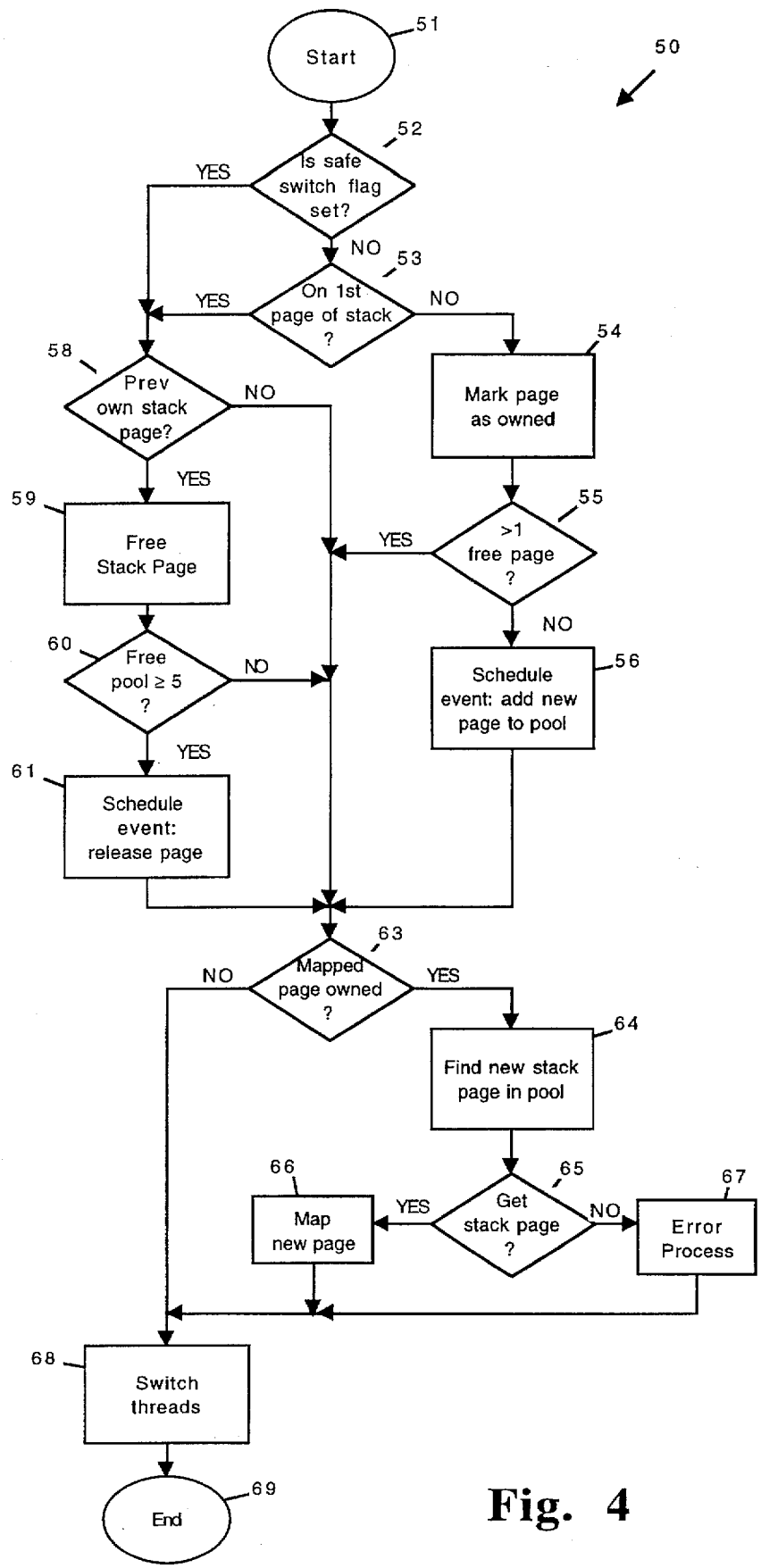
FIG. 4 is a flow diagram illustrating the operation of the preferred method for allocating locked stack pages.

Turning now to FIGS. 3–6, the preferred method for managing locked stack memory will be described. FIGS. 3a–3f are diagrams illustrating the relationship between logical (or virtual) addresses and physical memory addresses for a variety of threads when the present invention is used to provide locked 8K stacks. FIG. 4 is a flow diagram illustrating the preferred method for managing locked stack memory when the scheduler switches from one thread to another. FIGS. 5a and 5b are flow diagrams illustrating the preferred method for indicating whether a mapped stack page is in use when a thread jumps to another stack memory location. FIGS. 6a and 6b are diagrams illustrating the relationship between logical addresses and physical memory addresses for a variety of threads when the present invention is used to provide locked 16K stacks.

FIGS. 3a–3f, collectively referred to as FIG. 3, illustrate the use of the present invention in the preferred embodiment to increase the size of a thread's locked stack memory to 8K bytes on an as-needed basis. In this illustration, the operating system's scheduler switches between threads A, B, C, and D. The active thread is indicated by bold upper case text and the presence of the stack pointer.

For each thread, the boxes illustrate two 4K stack pages in the thread's logical (or virtual) address space (LP1 and LP2) and the physical memory pages to which these addresses are mapped by the virtual memory manager. The first 4K logical page (LP1) is mapped to a fixed, locked physical page (PP1). The second 4K logical page (LP2) is mapped to one of the unowned assignable locked stack pages (SP1, SP2, and SP3) in the pool of assignable locked stack pages. Each assignable stack page in the pool is considered to be either free or owned. If an assignable stack page is free, it can be mapped into the stack of any thread. An assignable stack page may be simultaneously mapped into the stack of more than one thread. An assignable stack page becomes owned if a thread is using the second 4K stack page when the scheduler switches away from that thread.

In FIG. 3, owned assignable stack pages are indicated by a bold solid line between the assignable stack page and the thread that owns it. Mapped assignable stack pages are indicated by a dashed line between the assignable stack page and the thread to which it is mapped. Each figure is like a snapshot that illustrates the status of the threads and memory pages immediately before the operating system begins the process of switching to another thread.

With reference to the example of FIGS. 3a–3f, each thread's LP2 stack page is initially mapped to the same stack page (SP1) and thread C is the first active thread. FIG. 3a illustrates the position of the stack pointer when the scheduler switches from thread C to thread B. At that point, thread C has nested deeply on its stack and is using the second 4K stack page. This causes SP1 to be owned by thread C. SP2 and SP3 remain unowned.

FIG. 3b uses a solid line to indicate that thread C owns SP1. When the scheduler switches to thread B, the system determines that the stack page that was originally mapped to thread B (i.e., SP1) is owned by another thread (thread C). The system then maps a new assignable stack page (SP2) to thread B's LP2. FIG. 3b illustrates the position of the stack pointer when the scheduler switches from thread B to thread D. At that point, thread B is not using the second 4K stack page. This allows SP2 to remain unowned.

When the scheduler switches to thread D, it determines that the original mapped stack page SP1 is owned by another thread (thread C). The system then maps unowned assignable stack page SP2 to thread D. FIG. 3c illustrates the position of the stack pointer when the scheduler switches from thread D to thread B. At that point, thread D has nested deeply on its stack and is using the second 4K stack page. This causes SP2 to be owned by thread D. SP3 remains unowned.

FIG. 3d uses solid line to indicate that thread C owns SP1 and thread D owns SP2. When the scheduler switches from thread D to thread B, the system determines that the mapped stack page SP2 is now owned by another thread (thread D). This causes the system to map unowned assignable stack page SP3 to thread B's LP2. FIG. 3d illustrates the position of the stack pointer when the scheduler switches from thread B to thread C. At that point, thread B is not using the second 4K stack page. This allows SP3 to remain unowned.

As shown in FIG. 3e, when the scheduler switches to thread C, it determines that the mapped stack page SP1 is not owned by another thread (in fact, it is already owned by thread C). When the scheduler switches from thread C to thread A, thread C is no longer using the second 4K page.

FIG. 3f illustrates that when the system switches to thread A, it determines that thread C no longer is using SP1 and returns SP1 to the unowned pool. Because SP1 is now unowned, thread A is able to run with SP1 mapped to its second 4K stack page.

This technique provides locked stack memory that allows a few threads to nest deeply on to their stacks without requiring the large memory overhead needed to provide 8K stacks for each thread. Those skilled in the art will appreciate that the size of the pool of assignable locked stack pages can be determined in a variety of ways. Typically, the number will be determined based on the characteristics and requirements of the specific operating system, and the probability that a thread will overflow its stack. An initial determination of the number of assignable stack pages may provide a single assignable stack page for every four threads, etc.

Turning now to the flow diagram of FIG. 4, the method 50 for allocating locked stack pages will be described in detail. The process illustrated in FIG. 4 is described in conjunction with FIGS. 1 and 2, and takes place at the time the scheduler switches from a first thread (thread 1) to a second thread (thread 2). The method includes two primary steps: to determine whether thread 1 needs to own its mapped stack page, and to determine whether thread 2's mapped stack page is owned by another thread. In addition to these main functions, the method also dynamically increases or decreases the size of the pool of stack pages. The number of unowned stack pages is increased when the number of unowned pages falls below a first threshold. Unowned stack pages are returned to the virtual memory manager when the number exceeds a second threshold.

The method 50 begins at step 51. At step 52 the method 50 determines whether a "safe switch" flag has been set by the operating system. The safe switch flag is described in more detail in conjunction with FIG. 5. Generally described, this flag is used when thread 1 has switched on to a different stack. When this occurs, the safe switch flag is used to indicate whether the assignable stack page mapped to thread 1 needs to be owned by thread 1.

If the safe switch flag is not set, the method proceeds to step 53 and determines if thread 1's stack pointer is pointing to the first 4K stack page. If not, this indicates that thread 1 is using the mapped assignable stack page, and causes the method 50 to go to step 54 where the assignable mapped stack page is marked as owned by thread 1. From step 54 the method 50 goes to step 55 and determines whether the pool of assignable stack pages includes more than one currently unowned stack page. If so, the method proceeds to step 63. If not, the method goes to step 56 and schedules an event by which the memory manager will add another unowned assignable locked stack page to the pool. From step 56 the method proceeds to step 63.

Returning now to steps 52 and 53, if the method determines that the safe switch flag is set or that the stack pointer is on the first page of thread 1's stack, the method 50 proceeds to step 58. At this step, the method 50 determines whether thread 1 previously owned its assignable mapped stack page. If so, the assignable mapped stack page is freed and returned to the pool of unowned stack pages (step 59). If the mapped stack page was not owned, the method proceeds to step 63.

Steps 60 and 61 are provided in order to ensure that the system does not build up an unduly large number of unowned assignable locked stack pages. At step 60 the method determines whether there are five or more unowned assignable stack pages. If so, the method proceeds to step 61 and schedules an event that will rerun one of the unowned assignable locked stack pages back to the virtual memory manager. This will result in a decrease in the overall amount of locked memory, which is accomplished when the virtual memory manager is available. After this event is scheduled, or if there are four or fewer unowned assignable stack pages, the method proceeds to step 63.

Those skilled in the art will appreciate that the steps for reducing the number of unowned assignable stack pages may be carried out at other times. For example, instead of carrying out the steps at thread switch time, the steps may be carried out when the operating system is terminating a thread and deallocating its resources. Although this alternative reduces the amount of code executed at thread switch time, it increases the amount of time before an unneeded assignable stack page is released.

Those skilled in the art will also understand that the threshold number of unowned assignable stack pages considered at step 60 may vary depending on the needs and characteristics of the operating system. In the preferred system, the threshold numbers represent empirical data determined by experimentation.

At step 63 the method 50 determines whether the assignable stack page that is currently mapped to thread 2 is owned by another thread. If not, the method proceeds to step 68 and switches to thread 2. From step 68 the method terminates at step 69.

If the method 50 determines that the assignable stack page mapped to thread 2 is owned (step 63) the method 50 goes to step 64 and tries to identify an unowned assignable stack page in the pool of assignable stack pages. If an unowned assignable stack page is available (step 65) the method 50 goes to step 66 and maps the unowned stack page to thread 2's second 4K stack page. Once the unowned assignable stack page is mapped to thread 2, the method 50 proceeds to step 68 and switches to thread 2.

If no unowned stack page is available at step 65 the method 50 goes to step 67 and performs an error routine. Those skilled in the art will understand that the system may be designed to take any number of different steps if no stacked page is available. These options include terminating thread 1, terminating thread 2, allocating an additional stack page, and unmapping the stack page (allowing thread 2 to run with only a 4K stack). In the preferred system, the error process 67 maps a "panic" page to thread 2's second 4K stack page. Those skilled in the art will appreciate that the panic page is a null page that can be written to and read from, although the accuracy of data read from the null page is not guaranteed. This condition may operate successfully if thread 2's use of the second 4K of its stack is temporary. From step 67 the method goes to step 68 and switches to thread 2 and terminates at step 69.

As mentioned briefly in conjunction with step 51, some system threads will allocate their own additional memory and switch to another stack if they determine they need a larger stack. If this happens, the method 50 would determine that thread 1's stack pointer is not in the first page, and would mark the assignable mapped stack page as owned even if that assignable stack page is not being used. The method 70, which is illustrated in FIG. 5a, is provided in order to avoid unnecessarily marking those pages as owned. In the preferred system, the method 70 is embodied in a service that is called by a thread when it switches to another stack. Generally described, the service determines whether the thread was using the assignable stack page when it switched to another stack. If not, the service sets a flag that indicates the assignable stack page was not in use.

Referring to FIG. 5a, the method 70 begins at step 71 when a thread that is switching stacks calls this service. The method saves the current status of the safe switch flag at step 72. Those skilled in the art will appreciate that this is done in order to restore the safe switch flag to its proper state when the thread returns to its original stack, even if the thread has used several nested stacks.

At step 73 the service determines whether the thread's stack pointer is on the first page at the time of stack switch. If so, the method sets the safe switch flag at step 74 and switches stacks at step 75. If the stack pointer is not on the first page, the method proceeds to step 75 and switches stacks. Once the service switches stacks, it calls back to the thread that called it (step 76) and terminates at step 77.

Figure 5B:
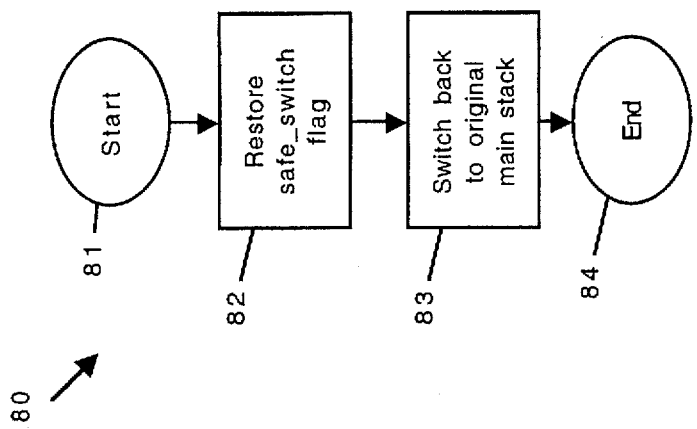
FIG. 5, consisting of FIGS. 5a and 5b, is a flow diagram illustrating a system service that is used when a thread switches stacks.
Figure 5A:
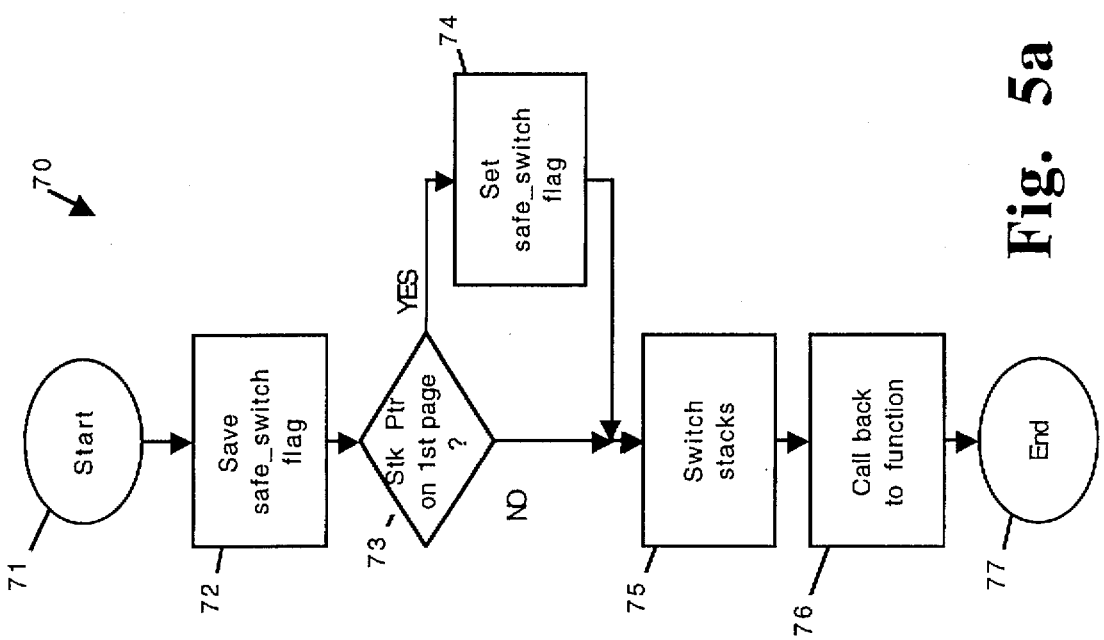

FIG. 5b illustrates the method 80 that is carried out when a thread that has switched stacks via the method of FIG. 5a returns to an earlier stack. FIG. 5b is embodied in a service that is called when the thread returns to a previous stack. The method 80 begins at step 81 when it is called by another thread. At step 82 the method restores the earlier status of the safe switch flag, which was saved at step 72 in FIG. 5a. Those skilled in the art will appreciate that restoring the flag returns it to its proper state, where simply clearing the flag would not take into account that a thread may have nested into several stacks.

After the safe switch flag is restored, the method 80 switches back to the thread's previous stack at step 82 and terminates at step 84.

Figure 6A:
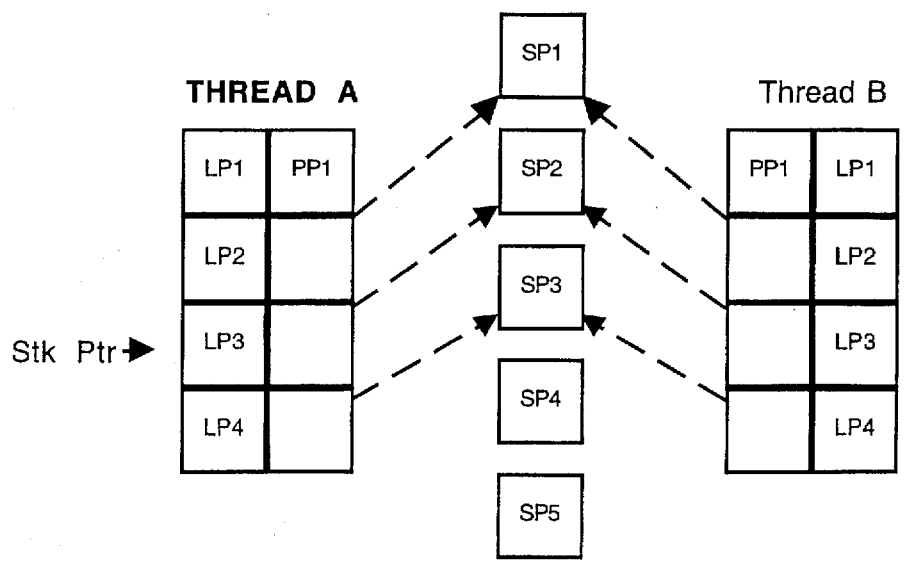
FIG. 6, consisting of FIGS. 6a and 6b, includes diagrams illustrating an alternative method for allocating multiple pages of locked stack memory.
Figure 6B:
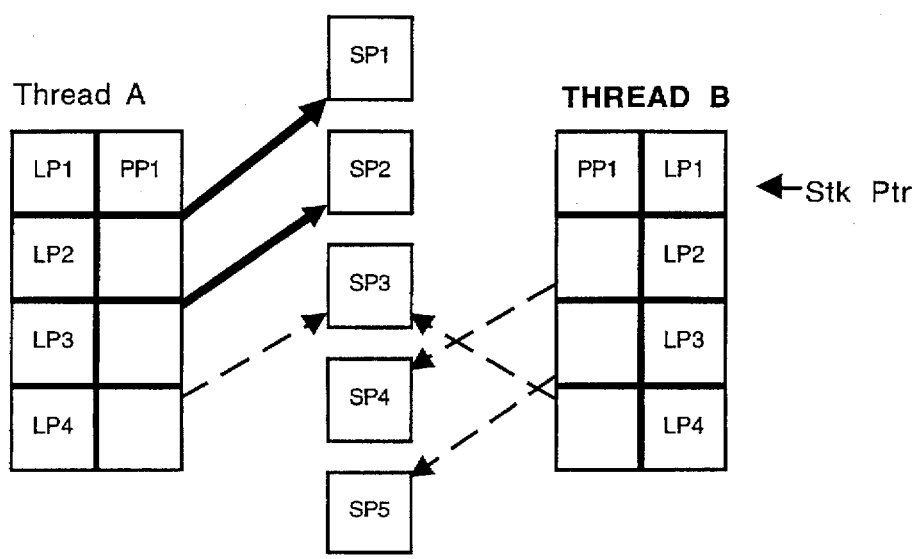

Those skilled in the art will appreciate that the present invention is not limited to 8K stacks and may be used on stacks of any size. FIGS. 6a and 6b, collectively referred to as FIG. 6, illustrate an alternative embodiment in which the present invention is used to provide locked 16K stacks.

In FIGS. 6a and 6b, there are two threads (A and B). Each thread has four 4K pages in its logical stack address space (LP1-4). The first 4K page is permanently mapped to physical memory PP1. The pool of assignable stack pages include five stack pages (SP1-5).

As in FIG. 3, the active thread is indicated by bold upper case text and the presence of the stack pointer. Owned assignable stack pages are indicated by a bold solid line between the assignable stack page and the thread that owns it. Mapped assignable stack pages are indicated by a dashed line between the assignable stack page and the thread to which it is mapped. Each figure is like a snapshot that illustrates the status of the threads and memory pages immediately before the operating system begins the process of switching to another thread.

Initially, LP2, LP3 and LP4 of both threads are mapped to SP1, SP2 and SP3, respectively. In FIG. 6a, thread A has been running and has nested deeply on to its stack when the scheduler switches to thread B. At that point, the system determines that SP1 and SP2 need to be owned by thread A and that thread B's stack memory must be remapped.

FIG. 6b indicates that SP1 and SP2 are owned by thread A and that thread B's LP2 and LP3 have been remapped to SP4 and SP5, respectively.

From the foregoing description, it will be appreciated that the present invention provides an efficient system and method for allocating locked stack memory on an as-needed basis. The present invention may be used on stacks of any size.

The foregoing method of the present invention may conveniently be implemented in a program module that is based upon the flow charts in FIGS. 4 and 5. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

The present invention has been described in relation to particular embodiments which are intended in all respects to be illustrative rather than restrictive. For example, although the present invention has been described in the context of a virtual memory scheme that uses 4K pages, those skilled in the art will understand that the principles of the present invention may be applied to, and embodied in, any type of computing device regardless of the page sizes that are used.

Similarly, the present invention is not limited specifically to threads but applies to any tasks or processes that require locked memory pages for dynamic structures such as program stacks. For example, the present invention may be applied to circular queues in a system where threads are copying data from a physical device to a locked buffer. Those skilled in the art will appreciate that a single assignable page may be used by mapping only an assignable page and no permanent page.

Alternative embodiments will become apparent to those skilled in the art to which the present invention pertains without departing from its spirit and scope. Accordingly, the scope of the present invention is defined by the appended claims rather than the foregoing description.

What is claimed is:

1. In a multitasking operating system managing a plurality of threads, a method for allocating memory to one of the threads, comprising the steps of:

creating a first thread;

mapping a first memory page to the first thread;

mapping a second memory page to the first thread;

executing a second thread;

receiving an indication to switch from the second thread to the first thread;

determining whether the second memory page is available to the first thread;

if the second memory page is not available to the first thread, mapping a third memory page to the first thread; and switching to the first thread.

2. A method for allocating memory as recited in claim 1, wherein determining whether the second memory page is available to the first thread comprises determining whether the second memory page is owned by a thread other than the first thread.

3. A method for allocating memory as recited in claim 1, further comprising the steps of:

determining whether the number of available memory pages exceeds a predetermined threshold; and adding an additional available memory page if the number of available memory pages does not exceed the predetermined threshold.

4. In a multitasking operating system managing a plurality of threads, a method for allocating memory to one of the threads, comprising the steps of:

creating a first thread;

creating a second thread;

creating a plurality of assignable memory pages, including a first assignable memory page and a second assignable memory page;

mapping the first assignable memory page to the first and second threads;

executing the first thread;

receiving an indication to switch from the first thread to the second thread;

determining, in response to the indication, whether the first thread is using the first assignable memory page;

if the first thread is using the first assignable memory page, preventing the second thread from using the first assignable memory page, otherwise, allowing the second thread to use the first assignable memory page; and switching to the second thread.

5. A method for allocating memory as recited in claim 4, further comprising the step of mapping a first permanent memory page to the first thread, and wherein determining whether the first thread is using the first assignable memory page comprises determining whether the first thread's stack pointer is pointing to the first permanent memory page.

6. A method for allocating memory as recited in claim 4, wherein determining whether the first thread is using the first assignable memory page comprises determining whether a predetermined flag is set.

7. A method for allocating memory as recited in claim 4, further comprising the step of mapping the second assignable memory page to the second thread if the first thread is using the first assignable memory page.

8. A method for allocating locked stack pages among a plurality of threads running in an operating system, comprising the steps of:

creating a first thread;

mapping a first permanent stack page to the first thread;

creating a second thread;

mapping a second permanent stack page to the second thread;

creating a plurality of assignable stack pages, including a first assignable stack page and a second assignable stack page;

mapping the first assignable stack page to the first and second threads;

executing the first thread;

receiving an indication to switch from the first thread to the second thread;

determining, in response to the indication, whether the first thread is using the first assignable stack page;

if the first thread is using the first assignable stack page, indicating that the first assignable stack page is owned by the first thread;

determining whether the first assignable stack page is available to the second thread;

if the first assignable stack page is not available to the second thread, mapping the second assignable stack page to the second thread; and switching to the second thread.

9. A method for allocating locked stack pages as recited in claim 8, wherein determining whether the first assignable stack page is available to the second thread comprises determining whether the first assignable stack page is owned by the first thread.

10. A method for allocating locked stack pages as recited in claim 8, wherein determining whether the first assignable stack page is available to the second thread comprises determining whether the first assignable stack page is owned by one of the plurality of threads other than the second thread.

11. A method for allocating locked stack pages as recited in claim 8, wherein determining whether the first thread is using the first assignable stack page comprises determining whether the first thread's stack pointer is pointing to the first permanent stack page.

12. A method for allocating locked stack pages as recited in claim 8, wherein determining whether the first thread is using the first assignable stack page comprises determining whether a predetermined flag is set.

13. A method for allocating locked stack pages as recited in claim 12, wherein the predetermined flag is set by the operating system when the first thread has jumped to another stack.

14. A method for allocating locked stack pages as recited in claim 8, further comprising the steps of:

determining, if the first thread is not using the first assignable stack page, whether the first thread owns the first assignable stack page; and freeing the first assignable stack page if the first thread owns the first assignable stack page.

15. A method for allocating locked stack pages as recited in claim 8, further comprising the steps of:

determining whether the number of unowned assignable stack pages exceeds a predetermined number; and releasing one of the unowned assignable stack pages if the number of unowned assignable stack pages exceeds the predetermined number.

16. A computer-readable medium having computer-executable instructions for performing steps comprising:

creating a first thread;

mapping a first memory page to the first thread;

creating a second thread;

mapping a second memory page to the second thread;

mapping a third memory page to the first and second threads;

executing the first thread;

receiving an indication to switch from the first thread to the second thread;

determining, in response to the indication, whether the first thread is using the third memory page;

if the first thread is using the third memory page, indicating that the third memory page is owned by the first thread;

determining whether the third memory page is available to the second thread;

if the third memory page is not available to the second thread, mapping a fourth memory page to the second thread; and switching to the second thread.

17. The computer-readable medium of claim 16, wherein determining whether the third memory page is available to the second thread comprises determining whether the third memory page is owned by the first thread.

18. The computer-readable medium of claim 16, wherein determining whether the first thread is using the third memory page comprises determining whether the first thread's stack pointer is pointing to the first memory page.

19. The computer-readable medium of claim 16, further comprising the steps of:

determining, if the first thread is not using the third memory page, whether the first thread owns the third memory page; and freeing the third memory page if the first thread owns the third memory page.

20. The computer-readable medium of claim 16, wherein the first and second memory pages are permanent locked stack pages and the third and fourth memory pages are assignable locked stack pages.

21. In a computer having memory and an operating system, a system for allocating the memory among a plurality of threads managed by the operating system, comprising:

a processing unit;

the processing unit being operative to:

create a first thread and a first permanent page mapped to the first thread;

map a first assignable stack page to the first thread;

execute a second thread;

receive an indication to switch from the second thread to the first thread;

determine whether the first assignable stack page is available to the first thread;

if the first assignable stack page is not available to the first thread, map a second assignable stack page to the first thread; and switch to the first thread.

22. The system of claim 21, wherein the processing unit determines whether the first assignable stack page is available to the first thread by determining whether the first assignable stack page is owned by a thread other than the first thread.

23. The system of claim 21, wherein the processing unit is further operative to:

determine whether the number of assignable stack pages exceeds a predetermined threshold; and add an additional assignable stack page if the number of available assignable stack pages does not exceed the predetermined threshold.

* * * * *